US012596615B2

(12) United States Patent
Lent et al.

(10) Patent No.: US 12,596,615 B2
(45) Date of Patent: Apr. 7, 2026

(54) COMPUTING SYSTEMS AND METHODS PROVIDING DATA MOBILITY FROM A FILE TO BLOCK STORAGE

(71) Applicant: Dell Products L.P., Round Rock, TX (US)

(72) Inventors: Arthur Lent, Newton, MA (US); Yasemin Ugur-Ozekinci, Oakville (CA)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/790,126

(22) Filed: Jul. 31, 2024

(65) Prior Publication Data

US 2026/0037384 A1      Feb. 5, 2026

(51) Int. Cl.
*G06F 11/10*        (2006.01)
*G06F 11/14*        (2006.01)
*G06F 11/1446*      (2026.01)

(52) U.S. Cl.
CPC ...... *G06F 11/1451* (2013.01); *G06F 11/1435* (2013.01); *G06F 11/1464* (2013.01)

(58) Field of Classification Search
None
See application file for complete search history.

(56) References Cited

U.S. PATENT DOCUMENTS

| | | | |
|---|---|---|---|
| 11,068,354 B1 | 7/2021 | Ugur-Ozekinci et al. | |
| 11,265,366 B2 | 3/2022 | Stefanov et al. | |
| 2016/0070623 A1* | 3/2016 | Derk .................. | G06F 9/45558 |
| | | | 714/6.23 |
| 2020/0241907 A1* | 7/2020 | Dornemann ........ | G06F 11/2097 |
| 2022/0342767 A1 | 10/2022 | Ugur-Ozekinci et al. | |
| 2022/0357997 A1 | 11/2022 | Aronov et al. | |
| 2023/0315503 A1* | 10/2023 | Lu ........................ | G06F 16/258 |
| | | | 718/1 |

* cited by examiner

*Primary Examiner* — Jau Shya Meng
(74) *Attorney, Agent, or Firm* — Fogarty LLP

(57) ABSTRACT

A technique may include generating a snapshot from a proprietary format, generating a snapshot of a block-based backend storage system, where the snapshot of the block-based back in storage system references the snapshot from the proprietary format. APIs associated with the proprietary format may then be used to read out application data as blocks and to write those blocks to an independent logical unit.

20 Claims, 3 Drawing Sheets

200

202 —
GENERATING A FIRST SNAPSHOT OF A VIRTUAL DISK, WHERE THE VIRTUAL DISK INCLUDES A FIRST FILE THAT IS STORED ON A STORAGE SYSTEM

204 —
GENERATING A SECOND SNAPSHOT OF A STORAGE SYSTEM

206 —
MOUNTING THE SECOND SNAPSHOT AND EMPLOYING A PLURALITY OF APIS, WHICH ARE NATIVE TO THE VIRTUAL DISK, TO READ DATA BLOCKS OF THE FILE VIA THE SECOND SNAPSHOT

208 —
WRITING DATA FROM THE DATA BLOCKS TO A LUN OF THE STORAGE SYSTEM

210 —
PERFORMING A PARTIAL DATA MOBILITY OPERATION ON CHANGED BLOCKS

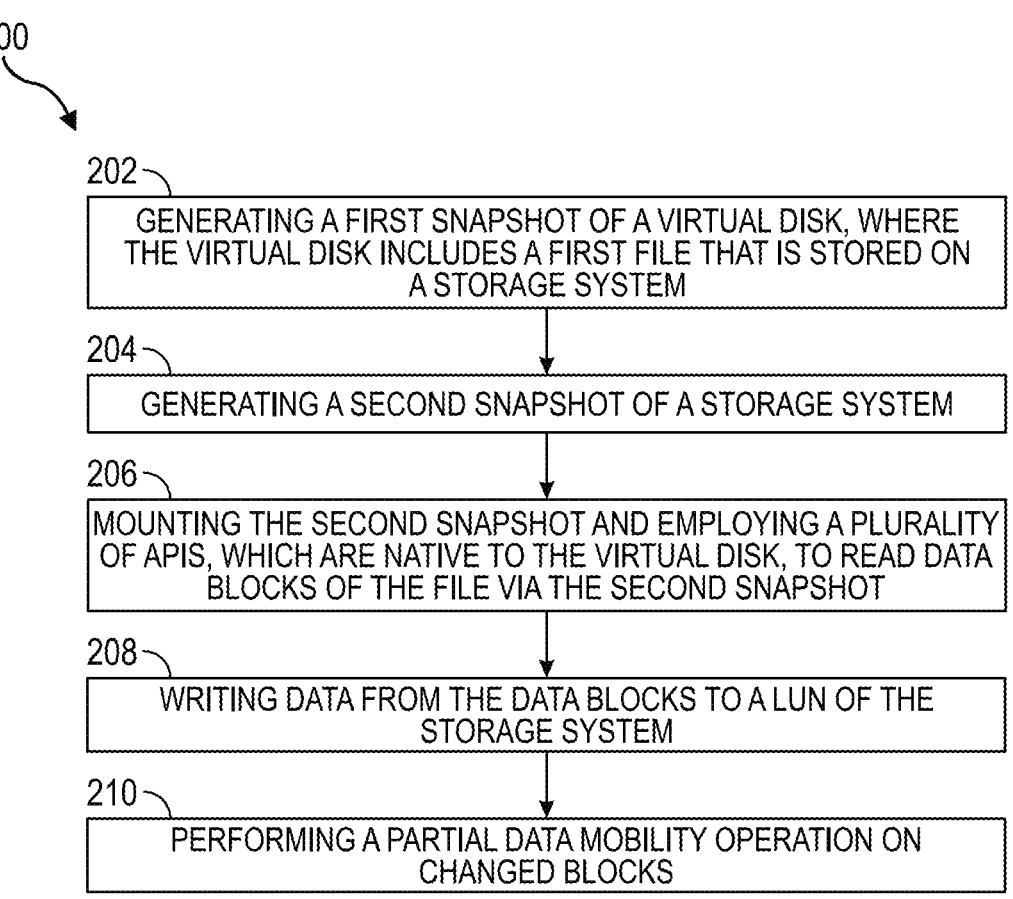

200

202
GENERATING A FIRST SNAPSHOT OF A VIRTUAL DISK, WHERE THE VIRTUAL DISK INCLUDES A FIRST FILE THAT IS STORED ON A STORAGE SYSTEM

204
GENERATING A SECOND SNAPSHOT OF A STORAGE SYSTEM

206
MOUNTING THE SECOND SNAPSHOT AND EMPLOYING A PLURALITY OF APIS, WHICH ARE NATIVE TO THE VIRTUAL DISK, TO READ DATA BLOCKS OF THE FILE VIA THE SECOND SNAPSHOT

208
WRITING DATA FROM THE DATA BLOCKS TO A LUN OF THE STORAGE SYSTEM

210
PERFORMING A PARTIAL DATA MOBILITY OPERATION ON CHANGED BLOCKS

COMPUTING SYSTEMS AND METHODS PROVIDING DATA MOBILITY FROM A FILE TO BLOCK STORAGE

FIELD

The present disclosure relates to computing systems and, more particularly, to systems and methods for providing data mobility from a hypervisor-specific virtual disk to hypervisor-neutral block storage.

BACKGROUND

As the value and use of information continues to increase, individuals and businesses seek additional ways to process and store information. One option available to application users is information handling systems. An information handling system generally processes, compiles, stores, and/or communicates information or data for business, personal, or other purposes thereby allowing application users to take advantage of the value of the information. Because technology and information handling needs and requirements vary between different application users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific application user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Further, as application users have more options as to where they store their data, application users may desire to move data from one storage arrangement to another storage arrangement. There is a need in the art for effective and efficient techniques for moving data.

SUMMARY

In some embodiments, a method includes: causing a first hypervisor snapshot of virtual disk to be generated, wherein the virtual disk includes a first file that is stored on a storage system in a format of a hypervisor; generating a second snapshot of a portion of the storage system; mounting the second snapshot, and employing a plurality of application programming interfaces (APIs), which are native to the hypervisor, to read a plurality of data structures of the file via the second snapshot; and writing data from the plurality of data structures to data blocks of a logical unit of the storage system, wherein the logical unit represents a first storage block device, wherein the first storage block device is independent of the virtual disk.

In some embodiments, an IHS (Information Handling System) includes: one or more processors; one or more memory devices coupled to the one or more processors, the one or more memory devices storing computer-readable instructions that, upon execution by the one or more processors, cause the IHS to: store a first snapshot to a data storage system, wherein the first snapshot includes data indicating a state of a virtual disk; generate a second snapshot of a portion of a storage system on which the first snapshot is stored; read out application data from the virtual disk via the second snapshot, including omitting to read out metadata defining a first format of the virtual disk; and write the application data to the storage system in a second format that is independent of the first format.

In some embodiments, a computer-readable storage device having instructions stored thereon for data mobility, wherein execution of the instructions by one or more processors of an information handling system (IHS) causes the one or more processors to: store a first snapshot to a data storage system, wherein the first snapshot includes data indicating a state of a virtual disk and a plurality of pointers to application data; generate a second snapshot of a portion of a storage system on which the first snapshot is stored; read out the application data from the virtual disk via the second snapshot, including reading out the application data in a format that is independent of a first format of the virtual disk; and write the application data to the storage system independently of the first format.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

FIG. 2 is an illustration of an example method for moving data from a proprietary-formatted data store to a hypervisor-neutral logical unit, according to embodiments.

DETAILED DESCRIPTION

Figure 1:
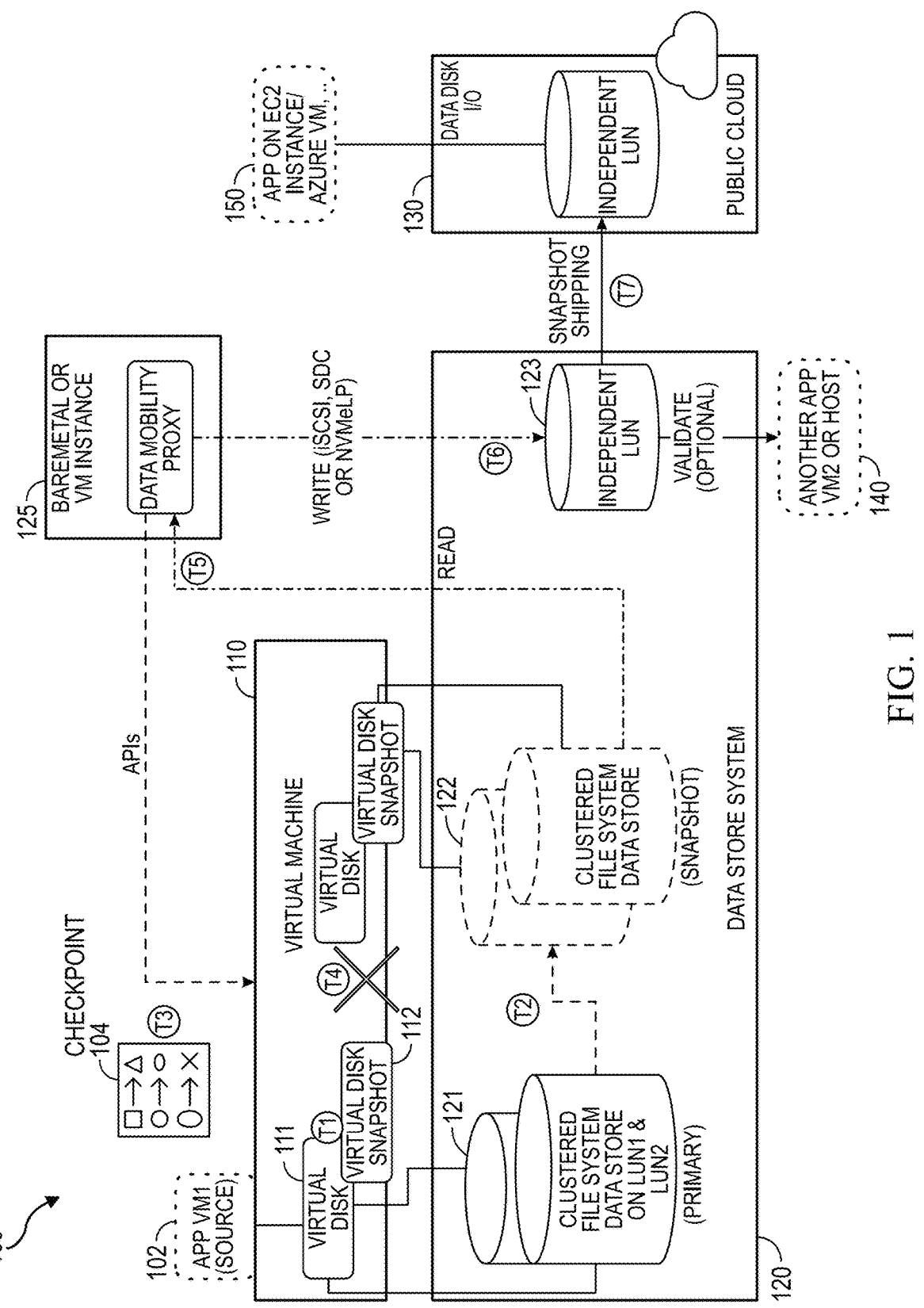
FIG. 1 is an illustration of an example system, according to some embodiments.

In the following description, numerous specific details are set forth in order to provide a thorough understanding of embodiments of the present disclosure. It will be apparent to one skilled in the art that embodiments of the present disclosure may be practiced without some of these specific details. Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). While embodiments of the present disclosure have been illustrated and described, the disclosure is not limited to these embodiments only. Numerous modifications, changes, variations, substitutions, and equivalents will be apparent to those skilled in the art, without departing from the scope of the disclosure, as described in the claims.

Some application users are relying on storage in the cloud and leveraging the elasticity of the cloud to meet their testing, development, analytics, and other data repurpose and workloads. Some application users have on-premises applications that use a block-based data storage system as a backend and utilize a proprietary virtual machine with a proprietary virtual disk format to store their data on the data storage system. However, a trend among some application users is to move away from the proprietary virtual machine and virtual disk format because of increased costs and perceived potential savings from moving to a hypervisor-neutral block storage logical unit for the data. For instance, one example virtual machine with a proprietary virtual disk format includes VMWARE's clustered file system that is offered under the name VMFS and uses a disk format referred to as VMDK. In such example system, a virtual server (e.g., a hypervisor) is configured to store an application user's data as a data store on a backend system as a file. Put another way, the virtual server may store the underlying application data on the backend system including metadata that organizes the application data as a proprietary file that is native to the virtual server. The virtual server may expose the application data as a storage drive for the application user to read/write, though the underlying format is of a proprietary file. The proprietary format of the file requires a proprietary hypervisor software stack to access the data. An application user may not be able to move the underlying data from the proprietary file format into a hypervisor-neutral block format, at least without some amount of complexity and processor/network overhead.

Various embodiments may allow an application user to move data from a proprietary format to an independent block storage logical unit (LUN) efficiently and while maintaining data coherency. In one example, a data mobility proxy application runs on a host device, which is configured to communicate with the backend storage system. The data mobility proxy application may receive a command from an application user or another application to move data from a proprietary format to an independent LUN.

The data mobility proxy application may use a process that starts with taking a snapshot of a source virtual disk that stores the data in the proprietary format. For instance, the data mobility proxy application may send a command to the virtual server to generate a hypervisor-native snapshot of the application. The hypervisor-native snapshot preserves a state of the virtual disk at that particular point in time. In other words, the hypervisor-native snapshot captures a point in time image of the virtual disk.

Subsequently, the data mobility proxy application may cause the backend storage system to generate a snapshot of a portion of the storage system in which the virtual disk is stored. As noted above, in this example, the backend storage system is used by the virtual server to store the proprietary file. The snapshot of the backend storage system preserves a state of the backend storage system at that particular point in time.

The data mobility proxy application may convert the hypervisor-native snapshot into a checkpoint and then delete the hypervisor-native snapshot. Nevertheless, the snapshot of the portion of the storage system still exists. Deleting the hypervisor-native snapshot may reduce an amount of input-output (I/O) overhead of a host device running the virtual server. Specifically, during existence of the snapshot, the host device may track accumulating changes in a separate file or location that may result in a II/O overhead to the virtual server during the reconciliation of these changes to the source virtual disk file. However, once the checkpoint is created and the hypervisor-native snapshot is deleted, it is generally expected that the overhead may be reduced.

Subsequently, the data mobility proxy application may mount the storage system snapshot as a storage block device. The storage system snapshot includes a representation of the hypervisor-native snapshot. Therefore, the data mobility proxy application may use hypervisor-native application programming interfaces (APIs) to read from the proprietary file by interfacing with the hypervisor-native snapshot as it is represented in the storage system snapshot.

The data mobility proxy application may use the APIs to read data blocks from the proprietary file. The data blocks include the underlying application data, and they may be read out without hypervisor-specific metadata. In other words, the data mobility proxy application may use the APIs to extract the underlying application data free of file formatting that is associated with the hypervisor. Nevertheless, data coherency is maintained because the underlying data itself remains intact.

The data mobility proxy application may write the data blocks to a LUN on the backend storage system. In this manner, the data mobility proxy application has moved the application data from the proprietary file format into a hypervisor-neutral and independent block format such as raw storage format. Furthermore, another application may mount the LUN as a storage block device, thereby providing the application user with full access to the data. For instance, the data mobility proxy application may present the backend storage block device LUN to another host and mount it as a D: drive or other appropriately named drive, and the application user may read and write to the application data in that drive.

Various embodiments may provide advantages. For instance, the data mobility proxy application may provide the application user with a relatively safe and convenient technique to move data from a proprietary format to a hypervisor-neutral format. Once the data is in a hypervisor-neutral format, the application user can further move the data as desired without the complication of the proprietary hypervisor software stack. For instance, the application user may keep the data on an on-premises backend storage, may replicate the data to a public cloud, or other appropriate action. Moving the data to a public cloud or other storage system without the proprietary software stack may generally be expected to include less overhead than would be associated with a similar move but with the proprietary software stack. In other words, some embodiments may reduce overhead and thereby increase efficiency. Some embodiments may further provide an application user with increased options for data storage.

Additionally, some embodiments may allow for deleting the hypervisor-specific snapshot once the data storage system snapshot has been generated. Such embodiments may decrease an amount of overhead that would otherwise be used to keep the snapshot in existence. In other words, some embodiments may provide the data movement with a reduced amount of overhead as a result of using the data storage system snapshot in lieu of using the hypervisor-specific snapshot.

While the examples herein may refer to VMWARE's clustered file system that is offered under the name VMFS, it is understood that the scope of embodiments is not limited to any particular proprietary data storage service. Rather, the scope of implementations may be adapted to any data movement from a proprietary data storage service to a hypervisor-neutral (or otherwise independent) data format, such as a block storage format. Examples of other proprietary data storage services include HYPER-V and the like. Furthermore, a proprietary data storage format is not necessarily limited to virtual machine-based applications, as other proprietary data storage formats may be based on containers or other appropriate technology. In other words, the scope of implementations may move data from any proprietary data storage format to an independent data format according to the principles of the disclosure.

FIG. 1 is an illustration of example system 100, according to some embodiments. Example system 100 includes data storage system 120, which may be configured to store relatively large amounts of data, such as petabytes of data. In one example, data storage system 120 may include a multitude of physical storage devices, such as hard disk drives, solid-state drives, and the like. The physical storage devices may be controlled by a storage controller (not shown), which performs low-level operations on the physical storage devices to cause the physical storage devices to write data and read data. For instance, the physical storage devices and the controller may be configured to store data according to a redundant array of independent disks (RAID) level or other redundancy scheme. Further in this embodiment, data storage system 120 may read and write data as storage blocks using different storage block protocols. Examples of storage block protocols may include Internet small computer systems interface (iSCSI), nonvolatile memory express (NVMe) over fiber channel or ethernet, or other appropriate protocol.

In one example, data storage system 120 may manage data in fixed-size blocks, such as 512 bytes or 1 kB. Each block may have a unique address, and data storage system 120 may store data in those blocks without any file system formatting native to data storage system 120 itself. Applications or an operating system can then read and write blocks directly, such as through a storage area network (SAN). However, the operating system or application may itself impose a file system or other kind of structure on its own data, so that the operating system or application may present the data as files to an application user.

Virtual server 110 may be a hypervisor, which itself is run on a computing device (not shown) that is in communication with the data storage system 120. For instance, the virtual server 110 may send read and write requests to the data storage system 120, and the data storage system 120 may then execute the read and write requests. Application 102 is an application that runs on an operating system of the virtual server 110. The virtual server 110, hosting application 102 in this example stores, data as a file onto data storage system 120. From the point of view of data storage system 120, the data associated with application 102 is block-based. However, virtual server 110 may impose proprietary file formatting on the data so that the data may only be read using protocols associated with a software stack of the virtual server 110 and the application 102. Further in this example, the virtual server 110 treats the file as a virtual disk 111 so that a user of the application 102 sees the data as a storage block device.

Data mobility proxy 125 is a software program, which may be run on a virtual machine or bare metal, and a computing device on which it runs may be a same or a different computing device than one associated with virtual server 110. Data mobility proxy 125 may be used to move data from the virtual disk 111 in a proprietary file format of virtual server 110 to a hypervisor-neutral independent LUN 123.

In this example, application data is user-provided data stored in an application format. For example, a word processor application may store application data as a docx file using NTFS file system application on a D: drive (or other appropriately named drive). This D: drive is stored as a hypervisor-specific file system data store virtual disk file(s) but it is exposed by the virtual server 110 to its virtual machine as a drive where the word processor application is running. The virtual server 110 stores the data content and metadata of the virtual disk 111 as the virtual disk files in its hypervisor file system. This hypervisor file system is physically stored on e.g., LUN1 and LUN2 on data storage system 120. The underlying application data may include any type of data, such as database data, file data (e.g., .docx or .pdf files) and/or the like. The underlying application data itself may include metadata to implement database formatting, file formatting, or the like, which is separate and independent from any hypervisor-specific metadata to implement the hypervisor-specific file format of virtual disk 111.

FIG. 1 illustrates a process at times T1-T7. At time T1, the data mobility proxy 125 causes application 102 to take a snapshot of virtual disk 111. In other words, the snapshot at time T1 is a snapshot that is native to the hypervisor of virtual server 110. In one example, data mobility proxy 125 may send a request (e.g., via APIs) to virtual server 110 for virtual server 110 to create a native snapshot. Virtual server 110 may then create snapshot 112. Snapshot 112 preserves a status of virtual disk at time T1. In one example, snapshot 112 may include state data, including a state of the virtual disk 111. However, in some implementations, snapshot 112 may not include the underlying application data, instead opting to use pointers to the underlying data to limit the total size of the snapshot 112. In any event, the scope of implementations may include any appropriate snapshot technique at time T1.

Virtual server 110 may use a significant amount of overhead after snapshot 112 is created. For instance, virtual server 110 may use overhead to track changes to the state of the virtual disk 111 after time T1. Furthermore, in this example, virtual server 110 may store snapshot 112 to the data store 121 where virtual disk 111 is located; i.e., the snapshot may be stored within data store 121 and be accessible via the APIs and the proprietary software stack of virtual server 110.

At time T2, the data mobility proxy 125 may generate a snapshot 122 of the data store 121 in the storage system 120. In one example, data storage system 120 includes functionality to create a snapshot of either the entirety of the data that it stores or portions of the data that it stores. In the present example at time T2, the data storage system 120 may take a snapshot of the data associated with virtual server 110, illustrated by LUN 1 and LUN 2 in data store 121. In this example, LUN 1 and LUN 2 are logical divisions of the storage space of data storage system 120 and are dedicated for use by virtual server 110.

The snapshot 122 may not be a full copy of data store 121. Rather, the snapshot 122 may include metadata pointing to data blocks and indicating a T1 point-in-time state of LUN 1 and LUN 2 as seen by the data storage system 120. As noted above, data storage system 120 is a block-based storage system, and the snapshot 122 may indicate a state of those data blocks.

The snapshot 122 essentially captures the snapshot 112, so that extracting the data content of the virtual disk 111 may be performed using the snapshot 112, via the snapshot 122, without requiring or accessing the virtual disk 111 directly.

At time T3, the data mobility proxy 125 may request the virtual server 110 to convert snapshot 112 into checkpoint 104. This causes virtual server 110 to track a bitmap of changed blocks of the application 102 according to the checkpoint 104. In this example, the checkpoint 104 may be a more robust data structure to track the state of application 102, including tracking memory state, CPU state input/output (I/O) state and the like.

At time T4, the data mobility proxy 125 may request the virtual server 110 to delete the snapshot 112. In this example, the overhead burden on virtual server 110 to maintain snapshot 112 may be greater than the overhead burden to track state using checkpoint 104 as the checkpoint does not need to track the actual change of the data content in the block and it is merely a map of bits each indicating whether the corresponding block is changed or not. Accordingly, once the virtual server 110 deletes the snapshot, based on the request from data mobility proxy 125, the virtual server 110 may see reduced overhead burden, such as reduced CPU usage, reduced memory usage, reduced I/O usage, reduced network usage, and the like.

Nevertheless, despite the deletion of snapshot 112, snapshot 122 has a representation of snapshot 112. At time T5, the data mobility proxy 125 may import the snapshot 122 (e.g., mounting snapshot 122 as a storage block device) and begin a read operation. Specifically, the data mobility proxy 125 may start reading data sectors from the representation of virtual disk snapshot 112 within storage system snapshot 122. The read operation may use APIs that are specifically used for virtual server 110, thereby allowing the data mobility proxy 125 to interact with the data of virtual disk 111. In one example, the hypervisor-specific format may store the underlying data as sectors, and the hypervisor specific block size which contains one or more sectors may be different than the block size used natively by data storage system 120. The hypervisor-specific format may number those sectors using an offset. The read operation may use the APIs to read data sectors from a first offset to a last offset within virtual disk 111.

At time T6, the data mobility proxy 125 writes the data from those data sectors (which were read at time T5) to an independent LUN 123. In this example, the LUN 123 is a block-based LUN, and the writing operation may be performed according to a block-based protocol, such as iSCSI, NVMe, or the like.

The actions at time T5 and time T6 may be performed in any appropriate manner. In one example, the actions may include extracting and converting the format of virtual disk 111 into a format of independent LUN 123, so that the data blocks stored to independent LUN 123 may be accessed without having to use a protocol stack specific to virtual server 110.

In one example, the data mobility proxy 125 unmasks independent LUN 123 to make it accessible from the data mobility proxy 125 and add it to device file paths that are used by a system on which data mobility proxy 125 is run. The data mobility proxy 125 may then determine an appropriate write block protocol (e.g., ISCSI, NVMe) and a corresponding device path and block size. Assuming that the data mobility proxy 125 runs in a Linux environment, then data mobility proxy 125 may further open a corresponding device path on Linux (e.g., /dev/sda) to access independent LUN 123 in block mode.

Continuing with the example, once the independent LUN 123 is accessible in block mode, then the data mobility proxy 125 may perform a loop. The loop may include: a) reading the data sectors from the virtual disk 111 through the snapshot 112 as represented in snapshot 122 using appropriate APIs, starting from a first offset of the sectors, and b) writing to the device path of the independent LUN 123 using the block size aligned with the target storage block size of data storage system 120. In an example in which the virtual disk 111 is a VMWARE virtual disk, the appropriate APIs may be those provided in VixDiskLib, though the scope of implementations may include moving data from any proprietary format.

Once all of the sectors from the first offset to the last offset have been written as appropriately-sized blocks to the independent LUN 123, then the data mobility proxy 125 may close the device path. In some examples, when reading the sectors from the virtual disk 111, if the data mobility proxy 125 encounters a zero sector or an unallocated sector, the data mobility proxy 125 may advance the write pointer to skip such a zero or unallocated sector instead of writing those as blocks in the device path.

At times T5 and T6, the data mobility proxy 125 copies data from a proprietary format into independent LUN 123. For instance, the proprietary format of virtual disk 111 is one of a or multiple disk image and descriptor files in the hypervisor proprietary file system (for example VMWARE VMFS). The data mobility proxy 125 may use the hypervisor-specific APIs to determine the type of the virtual disk 111, open virtual disk 111 using an appropriate mode such as read-only, and access the underlying application data as a set of sectors having an offset from 0 to N, where N is any appropriate positive integer representing the last sector that contains the data content of the virtual disk 111. The data mobility proxy 125 uses the hypervisor-specific APIs to read out the data from the sectors into a buffer (not shown). The data mobility proxy 125 may then write the data from the buffer into independent LUN 123 by aligning a block size with a block size that is used by the data storage system 120. In one example, the application data may still be in an application format, such as docx documents stored using WINDOWS NTFS, and the data mobility application described here may preserve that format.

The copying process of times T5 and T6 may omit writing hypervisor-specific file headers used by virtual server 110 to define the virtual disk 111. Alternatively, if the process were to copy the entire data store 121, this would have brought the inodes and other hypervisor-specific file system (e.g. VMFS) metadata with it, so that the final outcome would not be hypervisor-neutral. The example of FIG. 1 uses hypervisor-specific APIs to read the sectors from one or more files that contains application disk data in virtual disk 111, so that it does not carry over this hypervisor file system structure to the destination.

The data stored in independent LUN 123 may include a copy of the underlying application data. Such data may include database data, word file data, or the like, accessible by the application user once that the application user causes the independent LUN 123 to be mounted by a computing device. The LUN 123, once mounted, may appear as a drive or volume and may be read from and written to just as with any other storage drive or volume (e.g., D: drive). In other words, LUN 123 may be hypervisor-neutral such that it may be accessed using an appropriate block storage protocol (e.g., SCSI, NVMe) and without using the software stack of application 102 and/or virtual server 110.

As a result, the independent LUN 123 itself may be mounted by another computing device for, e.g., validation and/or operational use. Either the data mobility proxy 125 or perhaps functionality within data storage system 120 may be used to replicate independent LUN 123 to the public cloud 130 if appropriate at time T7. The application user may attach independent LUN 123 to any cloud compute instance (e.g., EC2 or other appropriate instance) without requiring a software stack associated with virtual server 110.

The example above assumes a snapshot of the full contents of LUN 1 and LUN 2, i.e., the full contents of virtual disk 111. The scope of implementations may be adapted for use with subsequent-in time copies. For instance, an application user may initially create independent LUN 123 using the full contents of the virtual disk 111 physically stored in LUN 1 and LUN 2. However, the application user may have one or more applications that continue to use virtual disk 111, thereby causing changes to the data in LUN 1 and LUN 2. The virtual server 110 and the application 102 may track those changes using, e.g., the checkpoint created at time T3. At a later time, such as a day later or a week later or so on, the application user may desire to implement those changes from virtual disk 111 to the data stored in independent LUN 123. The application user may cause data mobility proxy 125 to perform a similar process. The process may include creating snapshot 112, but only according to the changed data. The actions at time T5 and time T6 may then include generating a list or bitmap of the changed sectors in the virtual disk 111 since the given checkpoint created for T1 snapshot, using the change list or bitmap to figure out which sectors are changed and reading only the changed sectors using the hypervisor-specific APIs and then writing that changed data as changed blocks to the independent LUN 123. For instance, writing the changed blocks may include overwriting previously-stored blocks of independent LUN 123 with the changed blocks.

FIG. 2 is an illustration of example method 200, for data mobility, according to some embodiments. FIG. 2 may be performed by a software program, such as data mobility proxy 125 of FIG. 1. In other words, a physical computer may execute computer-readable code from a non-transitory medium. The computer, executing the computer-readable code, may perform the actions of method 200. Furthermore, method 200 may be performed by an application on an operating system that runs on bare metal, on a virtual machine or a container, or other appropriate scheme.

Action 202 includes generating a first snapshot of a virtual disk(s) using a hypervisor associated with the virtual disk. The virtual disk may include a first file that is stored on a storage system. As an example, the snapshot 112 of FIG. 1 is a snapshot of the virtual disk 111, and virtual disk 111 includes a file that is stored on the data storage system 120. The file includes application data as well as metadata.

Action 204 includes generating a second snapshot, where that second snapshot is a snapshot of the data store LUNs using the native storage system snapshot. As an example, the snapshot 122 is a snapshot that is native to the data storage system 120 of FIG. 1. The snapshot 122 is a snapshot only of LUN 1 and LUN 2.

At action 204, there is a snapshot within a snapshot. For instance, the first snapshot 112 was saved to the data storage system 120 in the LUN 1 and LUN 2. The snapshot 122 represents a state of the LUN 1 and LUN 2 (e.g., a state of virtual disk 111) and, by extension, represents a state of the snapshot 112.

The snapshot 112 may include metadata and incremental changes specific to the hypervisor, which organize the underlying application data according to the format used by the hypervisor of virtual server 110. In one example, the snapshot 112 includes pointers to the underlying application data. The snapshot 122 may include metadata, such as a bitmap or other data structure, which tracks a state of individual blocks that are defined as belonging to LUN 1 and LUN 2. The snapshot 122 may also include pointers to data of LUN 1 and LUN 2, where those pointers may further point to the hypervisor-specific metadata.

Action 206 includes mounting the second snapshot. For instance, the data storage system 120 may allow for a snapshot to be treated as a storage block device by an application that is communicatively coupled to the data storage system 120. Therefore, action 206 may include the data mobility proxy 125 opening a path to the second snapshot as it would open a path to a storage block device.

Action 206 may further include employing a plurality of APIs, which are native to the hypervisor, to read data blocks of the file via the second snapshot. In the example of FIG. 1, the data mobility proxy 125 uses APIs specific to the virtual server 110 to interact with the representation of snapshot 112 as it exists within snapshot 122. The data mobility proxy 125 may use the APIs to read the underlying data from sectors, as those sectors are defined by the hypervisor-specific format. Put another way, application 206 may include the data mobility proxy 125 reading out the underlying data from the data store 121 without reading out hypervisor-specific metadata that defines the file and the virtual disk 111. Also, while the examples herein refer to reading out the underlying application data from sectors, the scope of implementations is not limited to reading from the proprietary format in sectors. Rather, sectors and blocks are a similar concept, and it is generally considered that a block may include multiple sectors. Therefore, the example of action 206 and the example described above at FIG. 1 may include reading any type of data structure from the virtual disk 111, whether that data structure is a block, a sector, or other data structure.

Action 208 includes writing data from the data blocks to a LUN of the storage system. Action 208 may include writing the data from the sectors (or other data structure), as acquired via the representation of the snapshot 112, as data blocks in the data storage system 120. Action 208 may include writing the data from the sectors (or other data structure) into a buffer and then writing the contents of the buffer using block sizes that are aligned with blocks used by the data storage system 120 and allocated for the independent LUN 123.

Action 210 includes performing a partial data mobility operation on changed blocks. For instance, subsequent to action 208, the data in virtual disk 111 might have changed. The virtual server 110 and/or the application 102 may track those changes, and the partial data mobility operation may include extracting changed blocks through a snapshot within a snapshot technique described above. Those changed blocks may then be written to independent LUN 123.

The scope of implementations is not limited to the series of actions 202-210 above. Rather, various embodiments may add, omit, rearrange, or modify one or more of the actions. In one example, action 204 may further include generating a checkpoint based on the first snapshot and then deleting the first snapshot. Additionally, subsequent partial data mobility operations may be performed at any appropriate time.

Also, method 200 may include migrating the independent LUN to another storage, such as a public cloud, another on-premises storage system, or the like. Although not shown explicitly in FIG. 2, some embodiments may further include deleting the data store 121 (e.g., invalidating the data of LUN1 and LUN 2) after having written the underlying application data to the independent LUN 123.

Figure 3:
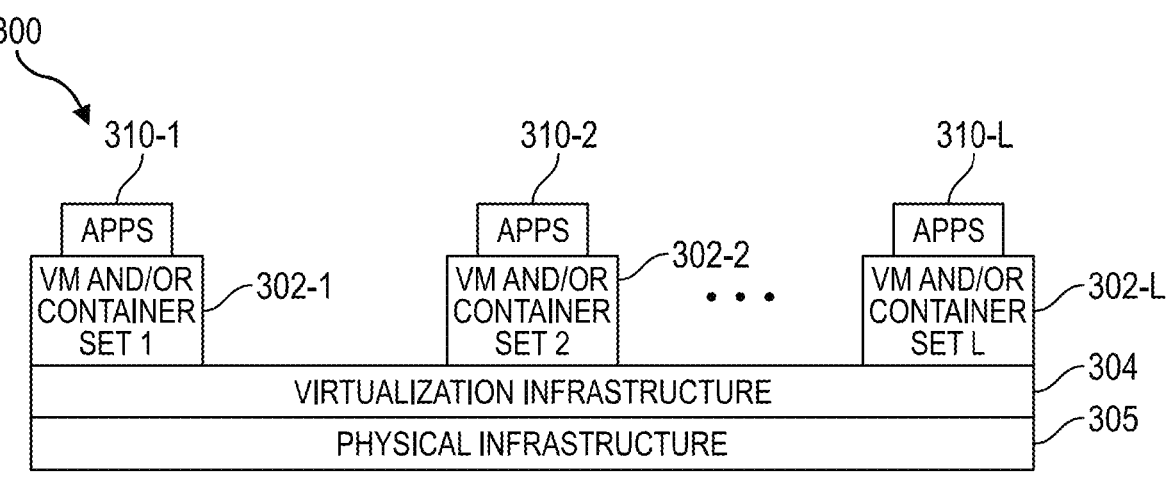
FIG. 3 is an illustration of an example processing platform that may be utilized in some embodiments.

FIG. 3 shows an example processing platform including virtual machine or container infrastructure 300. VM or container infrastructure 300 may represent an architecture that may be adopted by virtual server 110 and application 102. Furthermore, the data mobility proxy 125 may be implemented within a virtual infrastructure, such as infrastructure 300. In one example, application 102 may include a single application or multiple applications that are running on virtual machines or containers of infrastructure 300. Similarly, data mobility proxy 125 may include a single application or multiple applications that are running on virtual machines or containers of infrastructure 300.

The infrastructure 300 includes a combination of physical and virtual processing resources that are utilized to implement at least a portion of the system 100. The infrastructure 300 may include multiple virtual machines (VMs) and/or container sets 302-1, 302-2, . . . 302-L implemented using virtualization infrastructure 304. The virtualization infrastructure 304 runs on physical infrastructure 305 and may include one or more hypervisors and/or operating system-level virtualization infrastructure. The operating system-level virtualization infrastructure may include kernel control groups of a Linux operating system or other type of operating system.

The infrastructure 300 further may include sets of applications 310-1, 310-2, . . . 310-L running on respective ones of the VMs/container sets 302-1, 302-2, . . . 302-L under the control of the virtualization infrastructure 304. In one example, a given one of the applications 310 may correspond to an application that accesses a data object such as virtual disk 111. Furthermore, a given one (or ones) of the applications 310 may correspond to application 102 and/or, data mobility proxy 125 of system 100 of FIG. 1.

The VMs/container sets 302 comprise respective VMs, respective sets of one or more containers, or respective sets of one or more containers running in VMs. In some implementations of the FIG. 3 embodiment, the VMs/container sets 302 comprise respective VMs implemented using virtualization infrastructure 304 that may include at least one hypervisor.

A hypervisor platform may be used to implement a hypervisor within the virtualization infrastructure 304, where the hypervisor platform has an associated virtual infrastructure management system. The underlying physical machines may include one or more distributed processing platforms that include one or more storage systems.

In other implementations of the FIG. 3 embodiment, the VMs/container sets 302 include respective containers implemented using virtualization infrastructure 304 that provides operating system level virtualization functionality, such as support for containers running on bare metal hosts, or containers running on VMs. The containers may be implemented using respective kernel control groups of the operating system.

Figure 4:
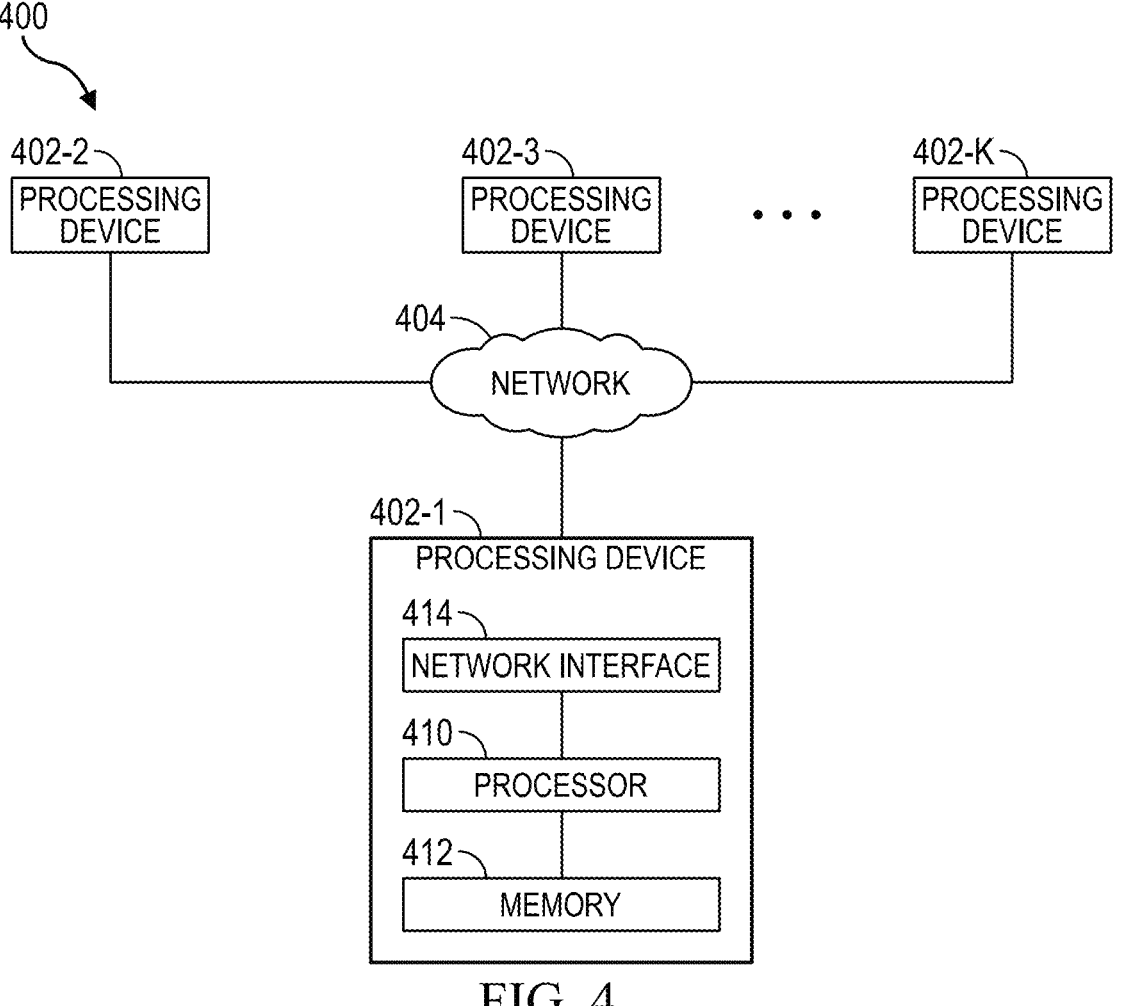
FIG. 4 is an illustration of an example processing platform that may be utilized in some embodiments.

One or more of the processing modules or other components of an information processing system may each run on a computer, server, storage device or other processing platform element. A given such element is viewed as an example of a computing device. The VM or container infrastructure 300 shown in FIG. 3 may represent at least a portion of one processing platform. Another example of such a processing platform is processing platform 400 shown in FIG. 4.

The processing platform 400 in this embodiment may include a portion of the system 100 and includes a plurality of processing devices, denoted 402-1, 402-2, 402-3, . . . 402-K, which communicate with one another over a network 404. For instance, one or more computing devices implementing backend storage functionality and/or one or more computing devices supporting virtual server 110 and data mobility proxy 125 may be configured as a processing platform according to the example of FIG. 6.

The network 404 may include any type of network, including by way of example a global computer network such as the Internet, a WAN, a LAN, a satellite network, a telephone or cable network, a cellular network, a wireless network such as a Wi-Fi or 5G network, or various portions or combinations of these and other types of networks.

The processing device 402-1 in the processing platform 400 may include a processor 410 coupled to a memory 412. The processor 410 may include a microprocessor, a microcontroller, an application-specific integrated circuit (ASIC), a field-programmable gate array (FPGA) or other type of processing circuitry, as well as portions or combinations of such circuitry elements.

The memory 412 may include random access memory (RAM), read-only memory (ROM) or other types of memory, in any combination. The memory 412 and other memories disclosed herein should be viewed as illustrative examples of processor-readable storage media or computer-readable media storing executable program code (e.g., computer-readable instructions) of one or more software programs.

Articles of manufacture including such processor-readable storage media are considered illustrative embodiments. A given such article of manufacture may include, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products including processor-readable storage media can be used.

Also included in the processing device 402-1 is network interface circuitry 414, which is used to interface the processing device with the network 404 and other system components and may include conventional transceivers.

The other processing devices 402 of the processing platform 400 are assumed to be configured in a manner similar to that shown for processing device 402-1. Each of the processing devices 402 is an example of an information handling system (IHS). Information handling systems may include any of a variety of devices, such as servers, personal computers, smart phones, and the like. Any of the processing devices 402 may be configured to execute computer-readable instructions to perform actions associated with FIGS. 1-2.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the implementation(s) described herein embrace all such modifications and changes and, accordingly, the above description should be regarded in an illustrative rather than a restrictive sense.

Although the implementation(s) is/are described herein with reference to specific embodiments, various modifications and changes can be made without departing from the scope of the present implementation(s), as set forth in the claims below. Accordingly, the specification and figures are to be regarded in an illustrative rather than a restrictive sense, and all such modifications are intended to be included within the scope of the present implementation(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method comprising:
performing the following actions by one or more processors of an Information Handling System (IHS):
    causing a first hypervisor snapshot of virtual disk to be generated, wherein the virtual disk includes a first file that is stored on a storage system in a format of a hypervisor;
    generating a second snapshot of a portion of the storage system;
    mounting the second snapshot, and employing a plurality of application programming interfaces (APIs), which are native to the hypervisor, to read a plurality of data structures of the file via the second snapshot; and
    writing data from the plurality of data structures to data blocks of a logical unit of the storage system, wherein the logical unit represents a first storage block device, wherein the first storage block device is independent of the virtual disk.

2. The method of claim 1, wherein the virtual disk is native to a software stack of a hypervisor, wherein the hypervisor is configured to expose the virtual disk as a storage drive.

3. The method of claim 1, wherein writing the plurality of data blocks to the first storage block device includes omitting metadata associated with the virtual disk.

4. The method of claim 1, further comprising:
replicating the first storage block device to a public cloud.

5. The method of claim 1, further comprising:
subsequent to generating the second snapshot, and prior to mounting the second snapshot, deleting the first hypervisor snapshot.

6. The method of claim 1, further comprising:
subsequent to generating the second snapshot, generating a checkpoint based upon the first hypervisor snapshot; and
deleting the first hypervisor snapshot.

7. The method of claim 6, further comprising:
tracking subsequent incremental changes to the file based on the checkpoint.

8. The method of claim 7, further comprising
generating a third snapshot of the application, wherein the third snapshot includes the subsequent incremental changes;

subsequent to generating the third snapshot, generating a fourth snapshot of another portion of the storage system;
mounting the fourth snapshot and reading a second plurality of data structures, via the fourth snapshot; and
writing data of the second plurality of data structures to the storage block device.

9. The method of claim 1, wherein the logical unit comprises a block-based logical unit.

10. The method of claim 1, further comprising:
reading from the first storage block device without using a software stack associated with the virtual disk.

11. The method of claim 1, wherein writing the data comprises:
aligning the data from the data structure of the virtual disk to a block size of the logical unit of the storage system.

12. An IHS (Information Handling System) comprising:
one or more processors;
one or more memory devices coupled to the one or more processors, the one or more memory devices storing computer-readable instructions that, upon execution by the one or more processors, cause the IHS to:
    store a first snapshot to a data storage system, wherein the first snapshot includes data indicating a state of a virtual disk;
    generate a second snapshot of a portion of a storage system on which the first snapshot is stored;
    read out application data from the virtual disk via the second snapshot, including omitting to read out metadata defining a first format of the virtual disk; and
    write the application data to the storage system in a second format that is independent of the first format.

13. The IHS of claim 12, wherein the computer-readable instructions to cause the IHS to read out the application data include computer-readable instructions to cause the IHS to:
    employ one or more application programming interfaces (APIs) specific to the virtual disk to read out the application data from a representation of the first snapshot in the second snapshot.

14. The IHS of claim 12, wherein the data indicating the state of the virtual disk includes the metadata defining the first format of the virtual disk and a plurality of pointers to the application data.

15. The IHS of claim 12, wherein the first format comprises a proprietary file format associated with a virtual machine or container, and wherein the second format comprises a data block format.

16. The IHS of claim 12, wherein the computer-readable instructions to cause the IHS to write the application data include computer-readable instructions to cause the IHS to:
    create a logical unit (LUN) on the storage system; and
    write the application data to the LUN.

17. The IHS of claim 12, further comprising computer-readable instructions to cause the IHS to:
    send a request to an application to create the first snapshot.

18. A non-transitory computer-readable storage device having instructions stored thereon for data mobility, wherein execution of the instructions by one or more processors of an information handling system (IHS) causes the one or more processors to:
    store a first snapshot to a data storage system, wherein the first snapshot includes data indicating a state of a virtual disk and a plurality of pointers to application data;

generate a second snapshot of a portion of a storage system on which the first snapshot is stored;

read out the application data from the virtual disk via the second snapshot, including reading out the application data in a format that is independent of a first format of the virtual disk; and write the application data to the storage system independently of the first format.

19. The non-transitory computer-readable storage device of claim 18, wherein the instructions to cause the one or more processors to write the application data to the storage system include instructions to cause the one or more processors to:

write the application data to the storage system according to a data block format, wherein the first format comprises a file format.

20. The non-transitory computer-readable storage device of claim 18, wherein the instructions to cause the one or more processors to store the first snapshot include instructions to cause the one or more processors to: store the first snapshot to a first logical unit (LUN) of the data storage system; and wherein the instructions to cause the one or more processors to generate the second snapshot include instructions to cause the one or more processors to: generate the second snapshot of the first LUN.

* * * * *